(12) United States Patent
Van Schepdael et al.

(10) Patent No.: US 9,421,747 B2
(45) Date of Patent: Aug. 23, 2016

(54) METHOD FOR MANUFACTURING A COMPOSITE RING, COMPOSITE RING, USE OF THE RING IN A SEAL ASSEMBLY AND SEAL ASSEMBLY

(75) Inventors: Ludo Van Schepdael, Herent (BE); Karel Kenis, Zwalm (BE); Eddy Vanswijgenhoven, Walshoutem (BE)

(73) Assignee: PARKER HANNIFIN MANUFACTURING BELGIUM, Boom (BE)

( * ) Notice: Subject to any disclaimer, the term of this patent is extended or adjusted under 35 U.S.C. 154(b) by 263 days.

(21) Appl. No.: 13/643,694

(22) PCT Filed: Apr. 29, 2010

(86) PCT No.: PCT/EP2010/055872
§ 371 (c)(1),
(2), (4) Date: Feb. 25, 2013

(87) PCT Pub. No.: WO2011/134525
PCT Pub. Date: Nov. 3, 2011

(65) Prior Publication Data
US 2013/0147125 A1 Jun. 13, 2013

(51) Int. Cl.
| | |
|---|---|
| *B32B 3/26* | (2006.01) |
| *B32B 37/16* | (2006.01) |
| *B29C 70/20* | (2006.01) |
| *B29C 70/32* | (2006.01) |
| *F16J 15/02* | (2006.01) |
| *B29L 31/00* | (2006.01) |

(52) U.S. Cl.
CPC ............... *B32B 37/16* (2013.01); *B29C 70/207* (2013.01); *B29C 70/32* (2013.01); *F16J 15/02* (2013.01); *B29L 2031/7096* (2013.01)

(58) Field of Classification Search
CPC ...... B32B 37/16; B32B 37/18; B32B 37/182; F16J 15/02; F16J 15/021; F16J 15/022
See application file for complete search history.

(56) References Cited

U.S. PATENT DOCUMENTS

| | | | |
|---|---|---|---|
| 3,873,106 A * | 3/1975 | Pastelak | ..................... 277/536 |
| 4,380,523 A | 4/1983 | Lind et al. | |
| 4,892,764 A | 1/1990 | Drain et al. | |
| 5,468,327 A | 11/1995 | Pawlowicz et al. | |

(Continued)

FOREIGN PATENT DOCUMENTS

| | | |
|---|---|---|
| EP | 0415207 | 11/1995 |
| EP | 0881057 | 12/1998 |

(Continued)

*Primary Examiner* — Gilbert Lee
(74) *Attorney, Agent, or Firm* — Jacobson Holman PLLC

(57) ABSTRACT

A method for manufacturing a composite ring (1) comprising the steps of:
(a) providing band-shaped means (2) of reinforcement fibers (5, 5') impregnated with a high temperature thermoplastic material and
(b) wrapping the band-shaped means (2) around a mandrel (9) to form the ring (1) in such a way that a first group (5) of the embedded reinforcement fibers extends substantially continuously along a first direction (3) with respect to the circumferential direction (10) of the ring (1), characterized in that the band-shaped means (2) is wrapped in such a way that a second group (5') of the embedded reinforcement fibers extends substantially continuously along a second direction (4) different from the first direction (3) with respect to the circumferential direction (10) of the ring (1).

11 Claims, 3 Drawing Sheets

(56) References Cited

U.S. PATENT DOCUMENTS

| | | | |
|---|---|---|---|
| 7,179,525 B2* | 2/2007 | Dove | 428/316.6 |
| 2004/0175571 A1* | 9/2004 | Buerger et al. | 428/421 |
| 2005/0202233 A1* | 9/2005 | Dove | 428/316.6 |
| 2005/0225037 A1* | 10/2005 | Dove | 277/610 |
| 2013/0175766 A1* | 7/2013 | Scholz | 277/590 |

FOREIGN PATENT DOCUMENTS

| | | |
|---|---|---|
| FR | 2835469 | 8/2003 |
| JP | 10019048 | 1/1998 |
| RU | 2040403 | 7/1995 |
| SU | 101057 | 11/1954 |
| WO | WO 94/20285 | 9/1994 |

\* cited by examiner

METHOD FOR MANUFACTURING A COMPOSITE RING, COMPOSITE RING, USE OF THE RING IN A SEAL ASSEMBLY AND SEAL ASSEMBLY

This is a 371 of PCT/EP2010/055872 filed Apr. 29, 2010, hereby incorporated by reference.

The present invention relates to a method for manufacturing a composite ring according to the preamble of the first claim. The present invention also relates to a composite ring, use of the ring in a seal assembly and a seal assembly.

Such a method for manufacturing a composite ring is already known to the person skilled in the art. In one such method, a tape of carbon fibres extending along longitudinal direction of the tape and impregnated with PEEK is continuously wrapped around a mandrel until a composite ring with a predetermined thickness is formed. In this ring the tape is wrapped such that it extends along circumferential direction of the ring such that the reinforcement fibres extend along the circumference of the ring in a single direction around the axis of the ring with respect to the circumferential direction of the ring. The tape thereto has a constant width and is wound around the mandrel such that each layer covers underlying layers.

With high temperature thermoplastic materials, in the context of the current application, is meant thermoplastic materials with a melting temperature of above 150° C. or even higher. Examples of such high temperature thermoplastic materials are for example PEEK, polyamide-imide, etc.

Such high temperature thermoplastic materials are known to be more resistant to high temperature, high pressure, chemical degradation, i.e. are more chemically inert and/or are more resistant against degradation, etc. Therefore, high temperature thermoplastic materials are often used in applications which have high demands in relation to temperature, pressure, chemical abrasion, etc.

However, certain properties, such as for example strength in a direction parallel to the axial direction of the ring, of rings made according to the method of the state of the art described above are still insufficient for certain applications.

It is therefore an object of the current invention to provide composite rings which are more resistant to for example high-temperature, high pressure, chemical degradation, etc. and in combination offer improved strength, for example, but not limited to, along a direction parallel to the axial direction of the ring.

It is known to the person skilled in the art that properties such as the strength of composite rings in directions parallel to the axial direction of the ring can be improved by providing reinforcement fibres which extend in directions different from circumferential direction of the ring. A typical and very known method for manufacturing such a ring is by wet filament winding.

U.S. Pat. No. 4,892,764 for example describes a method for making a cylindrical object by wet filament winding around a mandrel. The filaments, in the form of rovings, are impregnated with a thermosetting resin before they are wound around the mandrel. The resin needs to be cured.

Although filament winding is a suitable method for producing cylindrical objects, such as rings, wet filament winding is not suitable for use with high temperature thermoplastic materials. The reason is that thermoplastic polymers have a significantly larger viscosity when compared to uncured thermosetting resins. This is illustrated in FIG. 1 where the viscosity (in Pa·s on the vertical Y-axis) of some example thermoplasts are illustrated as a function of temperature (in ° C. on the horizontal X-axis). These high viscosities seriously hamper impregnation of the reinforcement fibres, for example rovings, with the high temperature thermoplastic material to produce a ring with the desired characteristics. The problem of properly impregnating reinforcement fibres with a thermoplastic material is for example illustrated in U.S. Pat. No. 4,380,523.

Therefore, the method known to the person skilled in the art for making composite rings cannot be used to produce composite rings having reinforcement fibres which extend in two different directions with respect to the circumferential direction of the ring and which are impregnated with high temperature thermoplastic material.

The inventor has now surprisingly found that the object of the current invention is achieved with a method for manufacturing a composite ring showing the technical features of the characterising portion of the first claim.

Thereto, in the method according to the present invention the band-shaped means is wrapped in such a way that a second group of the embedded reinforcement fibres extends substantially continuously along a second direction different from the first direction with respect to the circumferential direction of the ring.

By wrapping the band-shaped means comprising the reinforcement fibres impregnated with a high temperature thermoplastic material in the correct way, two groups of fibres in which the fibres respectively extend along different directions can be obtained. Therefore, the method allows to provide composite rings which are more resistant to for example high-temperature, high pressure, chemical degradation, etc. due to the use of high temperature thermoplastic material and in combination offer improved strength due to the presence of the reinforcement fibres impregnated with the high temperature thermoplastic material.

In the context of the current application, with band-shaped means is meant for example rope, band, tape, intermingled fibres, cloth, etc.

In preferred embodiments of the current invention, the band-shaped means is wound along the circumferential direction of the ring. This method allows an easy creation of the first and second group of fibres for example using a band-shaped means which comprises the first and the second group of fibres and in which the first and second group of fibres respectively extend substantially continuously along a third and fourth direction, the fourth direction being different from the third direction, with respect to the longitudinal direction of the band-shaped means. In such a method it has been found that the first and second direction can be easily created as, for example, in further preferred embodiments according to the current invention, where the band-shaped means are wound such that the first and second direction are respectively parallel to the third and fourth direction and in other words the band-shaped means is wound around the mandrel such that a layer of the band-shaped means forming the ring covers underlying layers.

In preferred embodiments of the current invention, the first and the second group respectively form the weft and the woven of a woven material. When woven material forms part of the band-shaped means, the weft for example forms the first group and the woven for example forms the second group of fibres. In other preferred embodiments of the current invention, the band-shaped means comprises a first layer comprising the first group of fibres and a second layer superimposed on the first layer comprising the second group of fibres. Using such band-shaped means, different directions with respect to the circumference of the ring are easily obtained while offering specific strength properties to the ring in different directions. It has been found that the band-shaped means having the two layers can be customised according to specific demands. Moreover, the fibres of the first group have a relative small effect on the fibres of the second group since the fibres do not intertwine with each other as they are positioned in different layers which is for example important when large forces act on the different fibres.

In preferred embodiments of the current invention the first layer is made from a first further band-shaped means of uniformly orientated, preferably substantially continuous and more preferably continuous, reinforcement fibres impregnated with a high temperature thermoplastic material and the second layer is made by subsequently cutting pieces from a second further band-shaped means of uniformly orientated, preferably substantially continuous and more preferably continuous, reinforcement fibres impregnated with a high temperature thermoplastic material along the longitudinal direction of the second further band-shaped means. When cutting pieces from the second further band-shaped the cutting direction between the pieces from the second further band-shaped means is along a direction crossing the longitudinal direction of the second further band-shaped means and for example is substantially perpendicular, or even perpendicular, to the longitudinal direction of the second further band-shaped means. The pieces are subsequently adjacently superimposed along longitudinal direction of the first further band-shaped means on the first further band-shaped means such that the fibres of the first further band-shaped means are orientated along the third direction and the fibres of the second further band-shaped means are orientated along the fourth direction. Such a method allows for an easy creation of the band-shaped means and even allows that the band-shaped means can be created using a single further band-shaped means as the first further band-shaped means can also be used to provide the second further tape.

In a preferred embodiment, more layers, in particular a third layer is added on top of the first or the second layer. In a more preferred embodiment the third layer is added on top of the second layer and adjacent to the second layer such that the second layer is sandwiched between the first and the third layer. In such a configuration it is preferred that the orientation of the reinforcement fibres of the first and the third layer is substantially the same, preferably the same, but different from the second layer. It is further preferred that the fibres of the thirst and the third layer are substantially oriented along longitudinal direction of the first and the second layer and the reinforcement fibres of the second layer are oriented along a direction which is substantially perpendicular to the longitudinal direction of the second layer.

The invention also relates to a ring comprising at least a first and a second group of reinforcement fibres impregnated with a high temperature thermoplastic material extending substantially continuously in respectively a first direction and a second direction different from the first direction, with respect to the circumferential direction of the ring. Preferably such a ring is made according to the method according to the present invention.

The invention also relates to the use of the ring according to the invention in a seal assembly since such assemblies often require high demands with respect to strength in different directions of the ring and to tribological properties of the ring, etc. More specifically, the use of the ring as a seal or a backup ring in the seal assembly is desired.

The invention also relates to a seal assembly comprising a ring according to the invention, such as for example when the ring is a seal or a backup ring.

The present invention is further illustrated in the accompanied figures and description of the figures.

Figure 1:
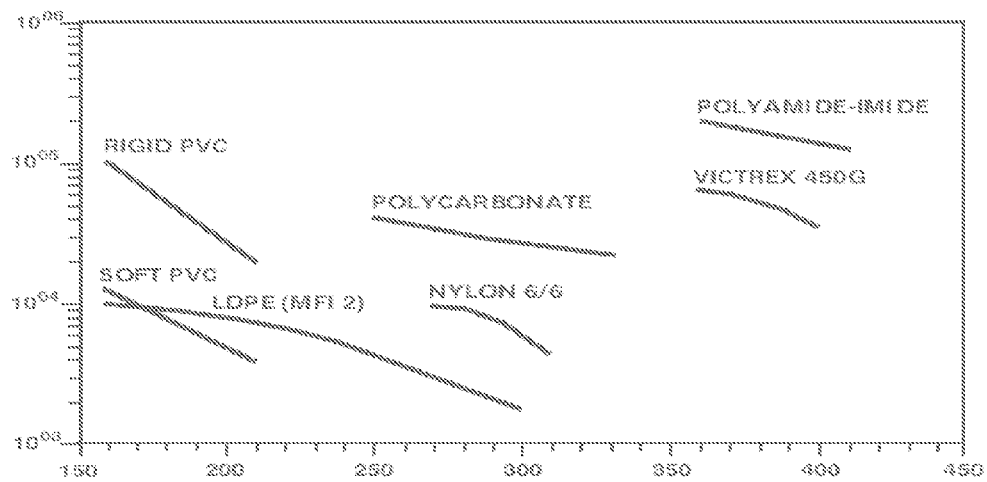
FIG. 1 shows a diagram showing the influence of temperature in ° C. on the viscosity of some thermoplastic materials.
Figure 2:
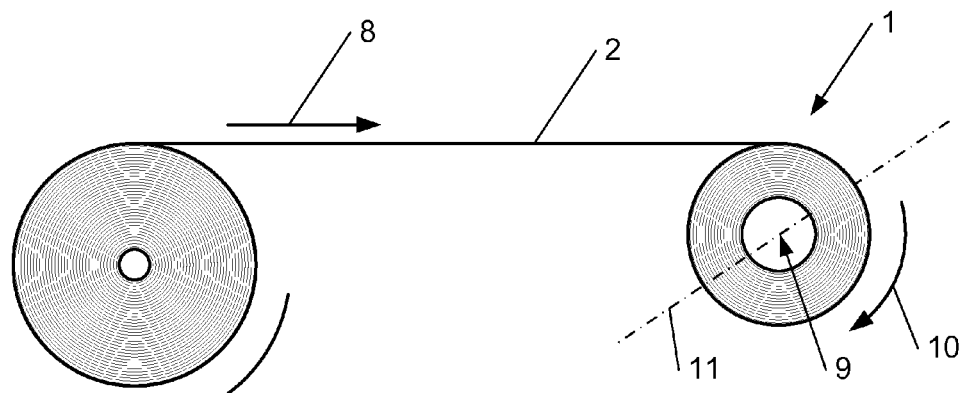
FIG. 2 shows an overview of an embodiment of the method according to the invention.

FIG. 2 shows an overview of an embodiment of the method for manufacturing a composite ring 1 according to the invention and more in particular shows a side view of the method. The method comprises the step of providing a band-shaped means 2 of reinforcement fibres 5, 5' impregnated with a high temperature thermoplast material. In a following step the band-shaped means 2 is wrapped around a mandrel 9 to form a ring 1. The wrapping of the band-shaped means 2 around the mandrel 9 is such that at least a first group 5 and a second group 5' of fibres extending substantially continuously with respect to the circumferential direction 10 of the ring 1 respectively in a first direction 3 and a second direction 4 different from the first direction 3 are created.

The number of layers of the band-shaped means 2 applied on top of each other are chosen such as to obtain the desired thickness of the ring 1, depending for example on the future application of the ring 1. Typically, a single layer for example has a thickness of between 0.1 mm and 0.5 mm and a number of layers of for example between 10-1000, more preferably 10-200, are applied on top of each other.

The mandrel 9 shown in FIG. 2 has a circular cross-section, the ring 1 therefore also having a circular inner cross-section. This is however not critical for the invention and the shape of the ring 1 can be determined by the person skilled in the art depending on the future application of the ring 1.

In FIG. 2 the band-shaped means 2 is unwound from a roll of band-shaped means 2 and transferred along longitudinal direction 8 of the band-shaped means 2 to the mandrel 9. This is however not critical for the invention and the band-shaped means 2 can also for example be pulled from a pile of stacked band-shaped means 2. However, using a roll of band-shaped means 2 is less prone to formation of, for example, knots in the band-shaped means 2 or other obstacles for allowing an easy transfer of the band-shaped means 2 to the mandrel 9.

The reinforcement fibres 5, 5' impregnated with the high temperature thermoplast material preferably are selected from the group of for example metal fibres, glass fibres, basalt fibres, carbon fibres, wool, cotton, flax, polyester, polypropylene, polyethylene, polyamide, aramide, polybenzobisxazol (PBO), etc. or mixtures of two or more of these. More preferably, the fibres 5, 5' are selected from the group of glass fibres, basalt fibres, aramide fibres or mixtures of two or more of these. Most preferably, the fibres 5, 5' are carbon fibres as carbon fibres offer improved properties with respect to for example strength. The reinforcement fibres 5, 5' preferably are grouped in several separate longitudinal rovings extending substantially continuously.

The high temperature thermoplastic material preferably comprises polyetherertherketon, usually named PEEK, as PEEK has improved mechanical and chemical properties.

However, although less preferred, other high temperature thermoplastic materials can be used such as for example polyimide.

The band-shaped means 2 preferably is in the form of a pre-impregnated material or a prepreg material in which the reinforcement fibres 5, 5' of the band-shaped means 2 have already been impregnated with a high temperature thermoplastic material such as PEEK.

The band-shaped means 2 comprises at least one group of reinforcement fibres 5, 5' which are for example grouped in a single group of rovings extending substantially continuously along substantially at least one extending direction. For example, a single direction, in which case wrapping of the band-shaped means 2 is specifically adapted such as to form the first and second group of reinforcement fibres 5, 5' in the ring 1, as will be explained later. The band-shaped means 2 can also comprise the first 5 and the second group 5' of fibres, with the first and second group 5, 5' of fibres respectively extending substantially continuously along a third and fourth direction 6, 7. In such applications, the fourth direction 7 is different from the third direction 6, with respect to the longitudinal direction 8 of the band-shaped means 2. Preferably the first and the second group of fibres 5, 5' are respectively grouped together in respective groups of rovings, the respective group of rovings extending respectively along the third 6 or the fourth 7 direction. Preferably, the rovings of the first 5 and the second 5' group of fibres extend substantially continuously along the third 6 and the fourth 7 direction respectively. The number of the rovings, the thickness of the rovings, etc. can be determined by the person skilled in the art depending on the specific application of the band-shaped means 2 and the ring 1.

The third and fourth direction 6, 7 can be perpendicular to each other, but can also extend under any other angle deemed appropriate by the person skilled in the art depending on the future application of the ring 1.

Figure 3A:
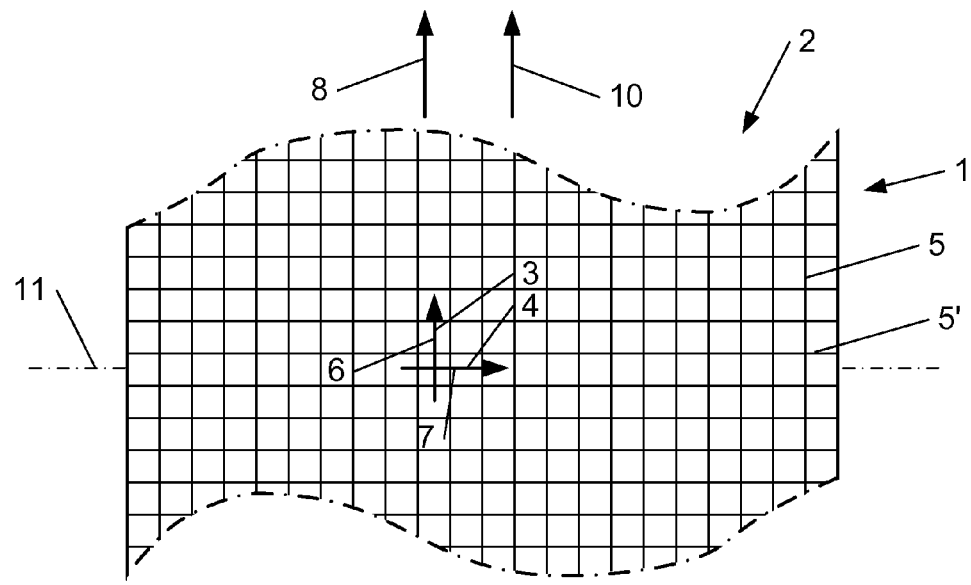
FIG. 3a shows a schematic top view of a detail of an embodiment of the ring according to the present invention with a part broken away.

A first embodiment of such a band-shaped means 2 is for example shown in FIG. 3a which shows a schematic top view of a detail of an embodiment of the ring 1 with a part broken away and, more precisely, shows a detailed view of a piece of the band-shaped means 2 as part of the ring 1. In the band-shaped means 2 shown, the first and the second group 5, 5', form the weft and the woven of a woven material. The woven material has been impregnated with the high temperature thermoplast material, for example, in the form of a prepreg material.

Figure 3B:
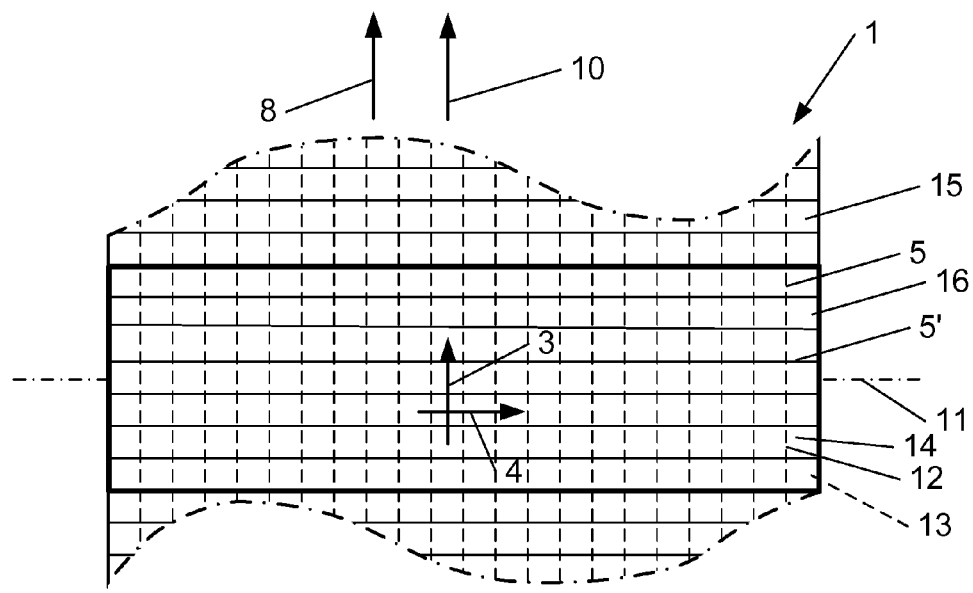
FIG. 3b shows a schematic top view of a detail of a different embodiment of the ring according to the present invention with a part broken away.
Figure 4:
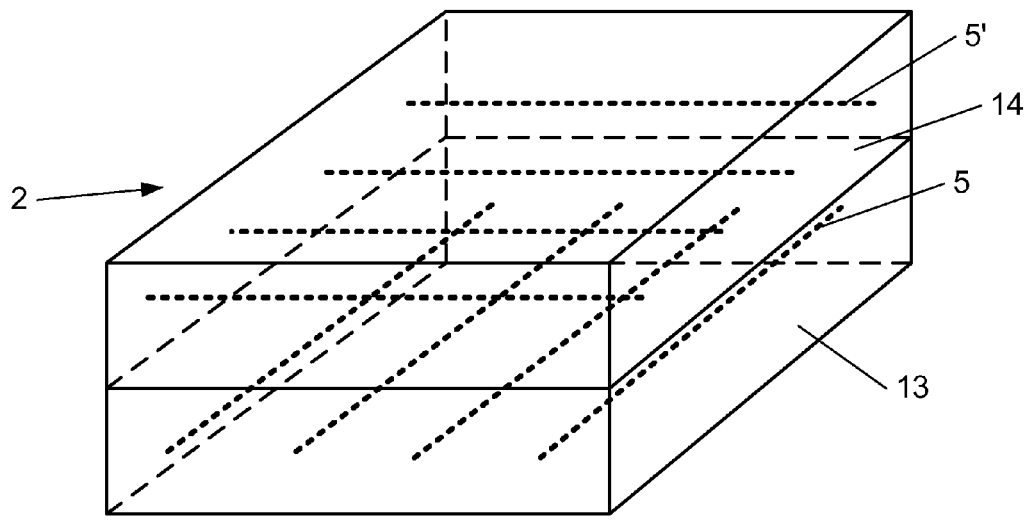
FIG. 4 shows a side view of a band-shaped means 2 with a part of the band-shaped means 2 cut away.

A second embodiment of the band-shaped means 2 is for example shown in FIG. 3b which shows a schematic top view of a detail of an embodiment of the ring 1 with a part broken away and, more precisely, shows a detailed view of a piece of the band-shaped means 2 as part of the ring 1. A detail of a side view of the band-shaped means 2 according to this embodiment is shown in FIG. 4. In the band-shaped means 2 shown, the band-shaped means 2 comprises a first layer 13, comprising the first group of fibres 5, and a second layer 14 superimposed on the first layer 13 comprising the second group of fibres 5'. As the reinforcement fibres 5 of the first group are not visible since they are covered by the second layer 14, they are indicated with dotted lines.

The first layer 13 is preferably made from a first further band-shaped means 15 of uniformly orientated reinforcement fibres 5 impregnated with a high temperature thermoplastic material. Preferably, as shown in FIGS. 3b and 4, the first group of reinforcement fibres 5 are grouped together in different rovings. The second layer 14 is preferably made by subsequently cutting pieces 12 from a second further band-shaped means 16 of uniformly orientated reinforcement fibres 5' impregnated with a high temperature thermoplastic material along the longitudinal direction of the second further band-shaped means 16 and adjacently superimposing the pieces 12 along longitudinal direction 8 of the first further band-shaped means 15 on the first further band-shaped means 15 such that the fibres 5 of the first further band-shaped means 15 are orientated along the third direction 6 and the fibres 5' of the second further band-shaped means 16 are orientated along the fourth direction 7. Although, the first further band-shaped means 15 and the second further band-shaped means 16 can be different band-shaped means and can for example comprise a different polymer material, reinforcement fibres, etc. the first 15 and the second 16 further band-shaped means can also be made of a single tape, for example the first further band-shaped means 15.

An example of a piece 12 cut from the second band-shaped means 16 and superimposed on the first further band-shaped means 15 is for example indicated in FIG. 3b. Although the pieces 12 may be superimposed on the first further band-shaped means 15 such that they extend, i.e. the longitudinal direction of the second band-shaped means 16 extends, along a direction substantially perpendicular to the longitudinal direction of the first further band-shaped means 15, as shown in FIG. 3b, this is not critical for the invention and the first further band-shaped means 15 can also extend under any other angle depending for example on the application in which the ring 1 will be used. In the case in which the pieces 12 extend along a direction substantially perpendicular to the longitudinal direction of the first further band-shaped means 15, the piece 12 can have any form and dimension, but preferably the length of the piece 12 along longitudinal direction of the second further band-shaped means 16 is substantially the same as the width of the first further band-shaped means 15 such that the thickness of the band-shaped means 2 obtained by superimposing the second further band-shaped means 16 on top of the first further band-shaped means 15 is substantially constant along width direction of the band-shaped means 2. When the pieces 12 extend along a different direction, the length of the pieces 12 along the longitudinal direction of the second further band-shaped means 16 and preferably also the cutting angle along which the pieces 12 are cut from the second further band-shaped means 16 preferably are adapted such that they can superimpose the first further band-shaped means 15 such that they fully cover the first further band-shaped means 15 and do not substantially extend over the edges of the first further band-shaped means 15. Often, the fibres 5, 5' of the first further band-shaped means 15 and the second further band-shaped means 16 extend substantially continuously along the longitudinal direction of the first 15 and the second 16 further tape. By changing the direction along which the pieces 12 extend with respect to the longitudinal direction of the first band-shaped means 15, for example by changing the angle along which the pieces 12 are cut from the second further band-shaped means 16 and appropriately superimposing the pieces 12 on the first further band-shaped means 15, the second direction 4 of the second group of reinforcement fibres 5' can be adapted, for example, depending on the future application in which the ring 1 will be used.

The wrapping of the band-shaped means 2 to form the ring 1 preferably is done by winding the band-shaped means 2 along the circumferential direction 10 of the ring 1 around the mandrel 9. Preferably, the longitudinal direction 8 of the band-shaped means 2 during winding is substantially parallel, most preferably parallel, to the circumferential direction 10 of the ring 1. In such a case the width of the band-shaped means 2 substantially equals the width of the resulting ring 1 measured along axial direction 11 of the ring 1. However, it is also possible that the longitudinal direction 8 of the band-shaped means 2 during winding is periodically changed with respect to the circumferential direction 10 during winding such that the band-shaped means 2 is helically wound around the mandrel 9 to form the ring 1. A top view of a ring 1 resulting from helically winding the band-shaped means 2 around the mandrel 9 is for example shown in FIG. 3c.

When wrapping the band-shaped means 2 such that the longitudinal direction 8 of the band-shaped means 2 during winding is substantially parallel, most preferably parallel, to the circumferential direction 10 of the ring 1, the first 5 and the second group 5' of reinforcement fibres are comprised in the band-shaped means 2 as described above and the first and the second direction 3, 4 are respectively parallel to the third and fourth direction 6, 7. Such a ring 1 is for example shown in FIGS. 3a and 3b.

Figure 3C:
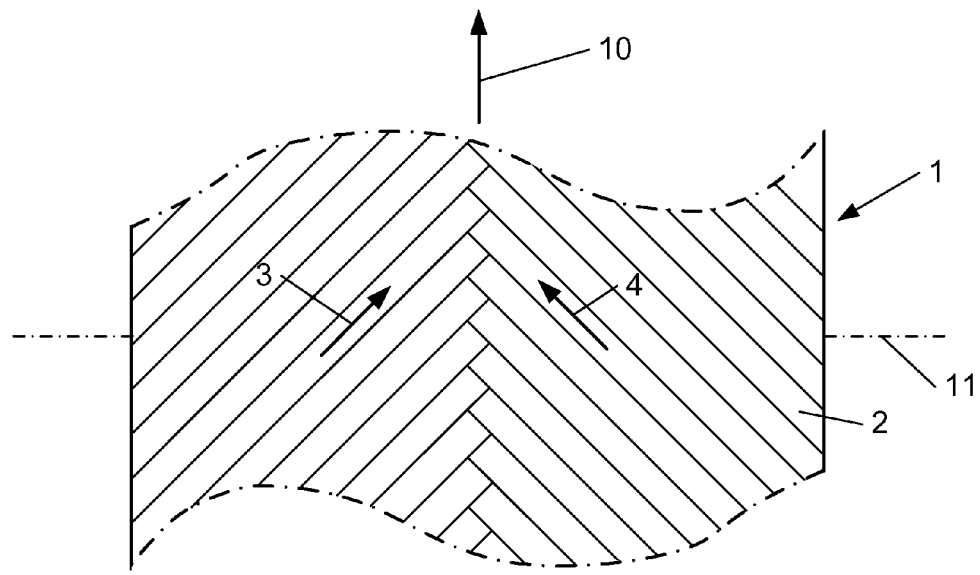
FIG. 3c shows a schematic top view of a detail of a different embodiment of the ring according to the present invention with a part broken away.

When wrapping the band-shaped means 2 by helically winding the band-shaped means 2 around the mandrel 9, at least two groups of reinforcement fibres 5, 5' are created during winding, as for example illustrated in FIG. 3c, since by helically winding the band-shaped means 2 around the mandrel, the winding direction of the band-shaped means 2 is periodically changed. Therefore, it is possible to use a band-shaped means 2 in which, for example, the reinforcement fibres 5, 5' extend along only a single direction with respect to the longitudinal direction 8 of the band-shaped means 2 to obtain a ring 1 comprising the first 5 and the second 5' group of reinforcement fibres. However, it is also possible to use a band-shaped means 2 already comprising the first 5 and the second group of fibres 5' extending respectively along the third and the fourth direction 6, 7 as described above, for example to create additional groups of fibres extending along an additional direction. This can however be determined by the person skilled in the art depending on the future applications in which the ring 1 will be applied.

After the ring 1 has been created by wrapping the band-shaped means 2 around the mandrel 9 or during wrapping of the band-shaped means 2, if prepreg material is used for the band-shaped means 2, the prepreg material of the band-shaped means 2, the band-shaped means substantially forming the ring 1, are heated and consolidated such that the different layers of the band-shaped means 2 forming the ring 1 are intimately connected. Preferably, the heating and consolidation is done during wrapping as this avoids the need for a separate heating and consolidation.

The ring 1 according to the invention, preferably resulting from the method described above, comprises at least a first 5 and a second 5' group of reinforcement fibres impregnated with a high temperature thermoplastic material. The first 5 and second 5' group of reinforcement fibres extend substantially continuously in respectively a first direction 3 and a second direction 4 different from the first direction 3, with respect to the circumferential direction 10 of the ring 1.

Such a ring 1 can be used in a seal assembly, for example as a seal or as a backup ring in which case a seal assembly is obtained comprising a ring 1 according to the invention.

The ring 1 obtained using such a method comprises a tape, more preferably substantially consisting of band-shaped means 2, more precisely the band-shaped means 2 as explained above, wound around the axial direction 11 of the ring 1. As explained above the band-shaped means 2 can be helically wound around the axial direction 11 of the ring 1 or can be wound along circumferential direction 10 of the ring 1 with the longitudinal direction 8 of the band-shaped means 2 being parallel to the circumferential direction 10.

The invention claimed is:

1. A method for manufacturing a composite ring (1) comprising the steps of:
    (a) providing band-shaped means (2) of reinforcement fibres (5, 5') impregnated with a high temperature thermoplastic material and
    (b) wrapping the band-shaped means (2) around a mandrel (9) to form the ring (1) in such a way that a first group (5) of the embedded reinforcement fibres extends substantially continuously along a first direction (3) with respect to the circumferential direction (10) of the ring (1),
characterised in that the band-shaped means (2) is wrapped in such a way that a second group (5') of the embedded reinforcement fibres extends substantially continuously along a second direction (4) different from the first direction (3) with respect to the circumferential direction (10) of the ring (1) and,
characterised in that band-shaped means (2) comprises the first (5) and the second group (5') of fibres and in that the first and second group (5, 5') of fibres respectively extend substantially continuously along a third and fourth direction (6, 7), the fourth direction (7) being different from the third direction (6), with respect to the longitudinal direction (8) of the band-shaped means (2).

2. A method for manufacturing a composite ring (1) according to the first claim 1, characterised in that the band-shaped means (2) is wound along the circumferential direction (10) of the ring (1).

3. A method for manufacturing a composite ring (1) according to claim 1, characterised in that the band-shaped means (2) is wound along the circumferential direction (10) of the ring (1) such that the first and second direction (3, 4) are respectively parallel to the third and fourth direction (6, 7).

4. A method for manufacturing a composite ring (1) according to claim 1, characterised in that the first and the second group (5, 5') respectively form the weft and the woven of a woven material.

5. A method for manufacturing a composite ring (1) according to claim 1, characterised in that the band-shaped means (2) comprises a first layer (13) comprising the first group of fibres (5) and a second layer (14) superimposed on the first layer (13) comprising the second group of fibres (5').

6. A method for manufacturing a composite ring (1) according to claim 5, characterised in that the first layer (13) is made from a first further band-shaped means (15) of uniformly orientated reinforcement fibres (5) impregnated with a high temperature thermoplastic material and the second layer (14) is made by subsequently cutting pieces (12) from a second further band-shaped means (16) of uniformly orientated reinforcement fibres (5') impregnated with a high temperature thermoplastic material along the longitudinal direction of the second further band-shaped means (16) and adjacently superimposing the pieces (12) along longitudinal direction (8) of the first further band-shaped means (15) on the first further band-shaped means (15) such that the fibres (5) of the first further band-shaped means (15) are orientated along the third direction (6) and the fibres (5) of the second further band-shaped means (16) are orientated along the fourth direction (7).

7. A method for manufacturing a composite ring according to claim 1, wherein the reinforcement fibres (5, 5') are selected from the group of glass fibres, carbon fibres, aramide fibres, basalt fibres, metal fibres, wool fibres, cotton fibres, flax fibres, polyester fibres, polypropylene fibres, polyethylene fibres, polyamide fibres, polybenzobisxazol fibres, and mixtures thereof.

8. A method for manufacturing a composite ring according to claim 1, wherein the reinforcement fibres (5, 5') are selected from the group of glass fibres, carbon fibres, aramide fibres, basalt fibres, wool fibres, cotton fibres, flax fibres, polyester fibres, polypropylene fibres, polyethylene fibres, polyamide fibres, polybenzobisxazol fibres, and mixtures thereof.

9. A method for manufacturing a composite ring according to claim 1, wherein the reinforcement fibres (5, 5') are selected from the group of glass fibres, carbon fibres, aramide fibres, basalt fibres, and mixtures thereof.

10. A method for manufacturing a composite ring according to claim 1, wherein the reinforcement fibres (5, 5') are selected from the group of glass fibres, carbon fibres, aramide fibres, and mixtures thereof.

11. A method for manufacturing a composite ring according to claim 1, wherein the reinforcement fibres (5, 5') are carbon fibres.

\* \* \* \* \*